Sept. 26, 1950   A. C. DE BEAUREGARD   2,524,007
SAFE PULL-OUT ALTITUDE COMPUTER Filed Nov. 21, 1946   4 Sheets-Sheet 1

INVENTOR.
AMEDEE COSTA
DE BEAUREGARD
BY

Sept. 26, 1950  A. C. DE BEAUREGARD  2,524,007
SAFE PULL-OUT ALTITUDE COMPUTER
Filed Nov. 21, 1946  4 Sheets-Sheet 2

INVENTOR.
AMEDEE COSTA
DE BEAUREGARD

Sept. 26, 1950     A. C. DE BEAUREGARD     2,524,007
SAFE PULL-OUT ALTITUDE COMPUTER Filed Nov. 21, 1946     4 Sheets-Sheet 3

*INVENTOR.*
AMEDEE COSTA
DE BEAUREGARD

INVENTOR.
AMEDEE COSTA
DE BEAUREGARD

UNITED STATES PATENT OFFICE 2,524,007

SAFE PULL-OUT ALTITUDE COMPUTER

Amedee Costa de Beauregard, Locust Valley, N. Y., assignor to Specialties, Inc.

Application November 21, 1946, Serial No. 711,324

3 Claims. (Cl. 33—46.5)

The present invention relates to aircraft dive bombing and has for an object to provide means for causing a pull-out from the dive before reaching a dangerously low altitude. It has been found that pilots during training in dive bombing are unable to estimate accurately the altitude at which pull-out must be begun. Also they concentrate so intently on guiding the plane in the dive toward the target that they are unaware of how close to the target they are and fail to pull out of the dive while at a sufficiently high altitude to make the pull-out safely.

The invention aims to provide a signal which will warn the pilot before he reaches a dangerously low altitude that he must begin his pull-out. It aims also to cause the pilot to begin his pull-out immediately upon receiving the signal without necessarily first changing his centre of attention.

The pull-out curve is a function of dive angle, speed of the plane, and the permissible centrifugal acceleration. The point beyond which it is unsafe to dive therefore depends upon the dive angle and the air speed.

By plotting suitable families of pull-out curves the minimum safe altitudes at which the pull-out must be begun under different conditions including dive angle, air speed, and the acceleration to which the pilot and the airplane can be subjected have been found.

It is to be noted that the acceleration at any moment during pull-out is the sum of the centrifugal force and the radial component of the vertical gravity pull. Such radial component is equal to gravity multiplied by the cosine of the angle between the momentary path of flight and the horizontal.

The study of pull-out curves revealed that a formula could be developed using the rate of descent as a principal factor and that instrumentation based on this formula could be developed which would effectively serve the purposes of the invention. The invention provides instrumentation which uses only two parameters, the altitude and rate of descent, and these parameters are supplied conveniently by available instruments.

In the development of the instrumentation and the formula on which it is based $4g$ has been adopted as a permissible centrifugal force to which is added a maximum of $1g$ at the low point of the pull-out.

The formula selected as a basis for instrumentation is $$H = e^{\frac{R}{275}} \cdot 540$$

wherein H represents the minimum safe pull-out altitude, e represents the base of the Napierian logarithms, 2.7183 and R represents the rate of descent as supplied by the rate of descent instrument.

The constants 275 and 540 have been chosen arbitrarily.

An altimeter is used in the instrumentation in order that a suitable signal for initiating the pull-out can be given when the minimum safe pull-out altitude is reached during the dive.

For the purposes of illustrating the principles of the invention, an apparatus including a U. S. Navy Sight Unit Mark 1 Mod 1 with a Specialties, Inc. Servo System will be described wherein the movable reticule is controlled during the dive by one means and when during the dive the altitude is reached where the pull-out must be initiated a second means controls the reticule movement to cause the pilot to pull out of the dive.

The instrumentation includes an altimeter, a rate of descent instrument and a computer into which factors from the altimeter and the rate of descent instrument are introduced and which computes the minimum safe pull-out altitude and when that altitude is reached initiates a second control circuit to move the reticule to depress the line of sight for causing starting of the pull-out. This instrumentation by depressing the line of sight provides an illustrative and particularly effective means for warning the pilot that the limit of safe altitude has been reached and provides also an effective means for causing the pull-out to be initiated.

In the arrangement illustrated, the means for initiating the pull-out involves an indication to the pilot whereby he operates the controls to pull out of the dive but he need not change his direction of attention before beginning the pull-out. The movement of the reticule may be, and preferably is such that after a brief interval the line of sight as indicated by the reticule is below the field of vision through the sight.

The nature and objects of the invention will be better understood from the consideration of a particular illustrative embodiment for the purposes of which description reference should be had to the accompanying drawings wherein Figure 1 is a schematic diagram of a suitable arrangement of sight unit and reticule control means.

Figure 1:
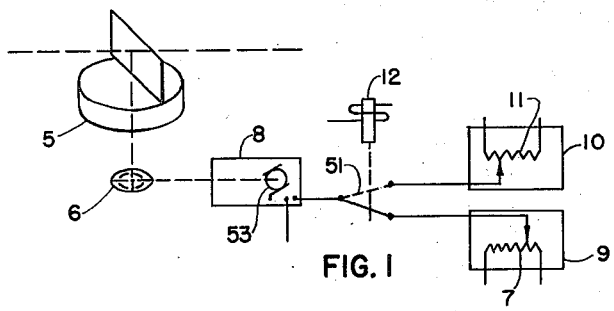

In the instrumentation shown for the purposes of illustrating the principles of the invention a sight unit 5 has a movable reticule 6 which is controlled during the dive toward a target from a potentiometer 7 by a remote control unit 8 in the sight unit. The potentiometer 7 may be a part of a dive control unit 9. Safe altitude computer 10 is arranged to cause initiation of the pull-out when the minimum safe pull-out altitude is reached. This may be by a signal to the dive control unit 9 actuating suitable circuits therein or by actuation of a relay 12 to disconnect potentiometer 7 and to connect the potentiometer 11 to the remote control unit 8.

Figure 2:
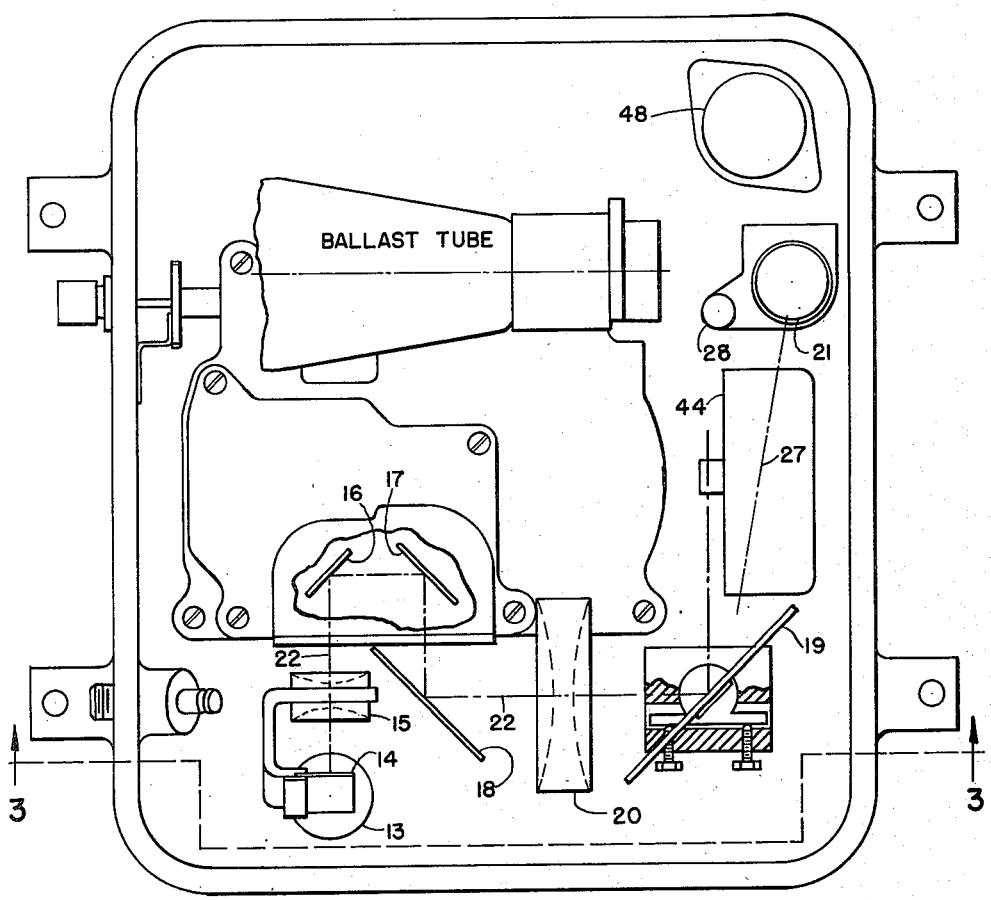
Fig. 2 is a plan view of the computer with cover removed.
Figure 3:
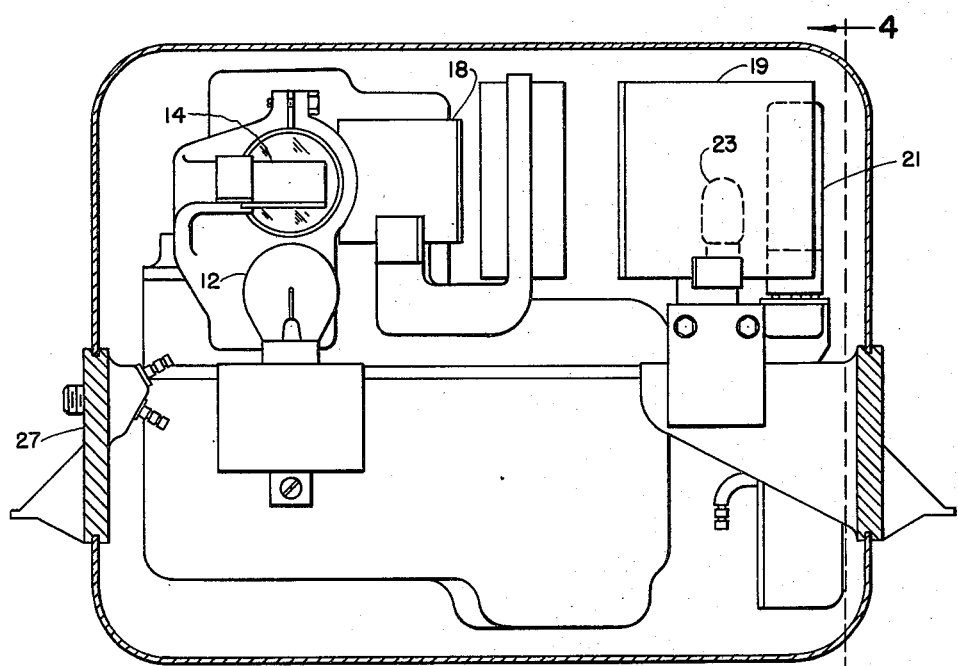
Fig. 3 is a vertical sectional view taken on the line 3—3 of Fig. 2.
Figure 4:
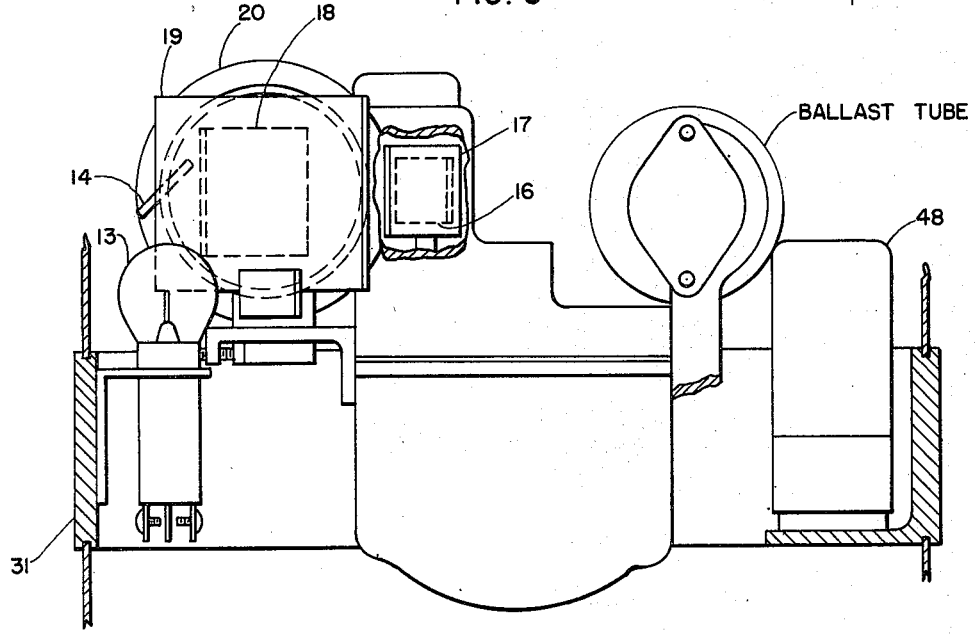
Fig. 4 is a sectional view taken on the line 4—4 of Fig. 3.

Referring to Fig. 2, the safe pull-out altitude computer comprises a lamp 13, light from which is directed by mirror 14 to a condenser lens 15 to form a parallel beam which passes successively to the mirrors 16, 17, 18, 19 and through another condensing lens 20 to impinge upon a photo electric cell 21 when the mirrors are in suitable position. Ordinarily when the airplane is flying at high altitude the beam of light follows the line indicated at 22. Mirror 16, secured on shaft 16' is rocked about a transverse axis under control of the rate of descent indicator 25 and mirror 17 is rocked about its axis under control of the altimeter 26. During the dive toward a target while the rate of descent is increasing and the altitude is decreasing the two mirrors will operate to swing the beam of light from the line indicated at 22 to the line indicated at 27 whereby when the minimum safe pull-out altitude for the then indicated rate of descent is reached the light will impinge upon and energize the photo electric cell 21 to cause current to flow in the plate circuit of tube 48 and operate relay 12. This will disconnect the potentiometer 7 and connect the potentiometer 11, to cause the pull-out to be initiated. For the purpose of testing certain parts of the circuit the photo electric cell 21 can be energized by closing the circuit of lamp 28 by means of a hand switch 28'. A filament integrity checking relay 29 is included in the testing circuit.

The mirrors 16 and 17 together with the rate of descent instrument 25 and the altimeter 26 are mounted in a casing 30 which is attachable as a unit to the frame 31 of the pull-out computer casing.

Figure 5:
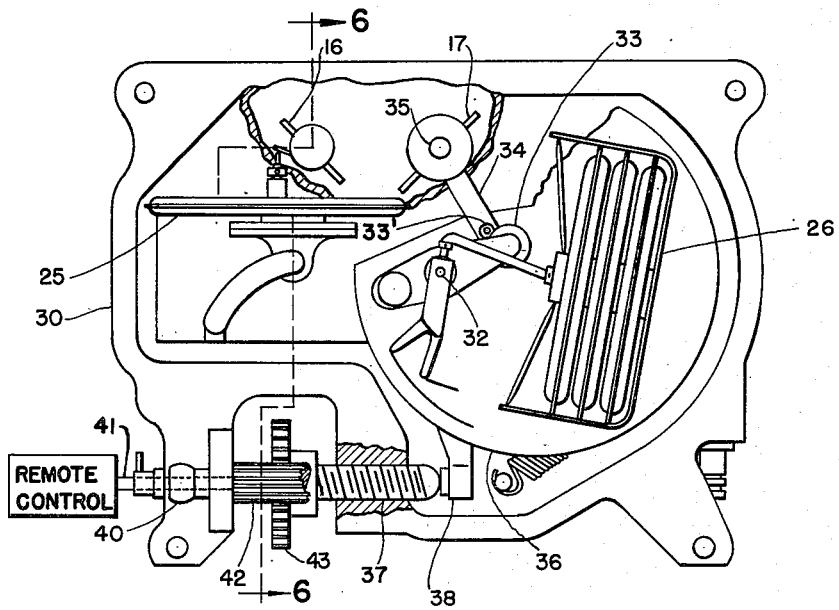
Fig. 5 is a detail view showing the arrangement of altimeter and rate of descent indicator.
Figure 6:
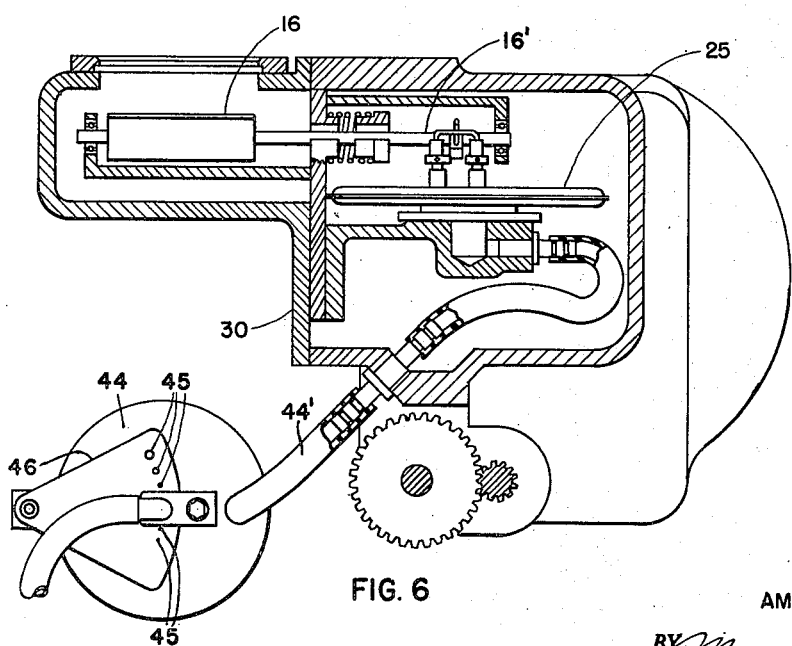
Fig. 6 is a sectional view taken on the line 6—6 of Fig. 5.
Figure 7:
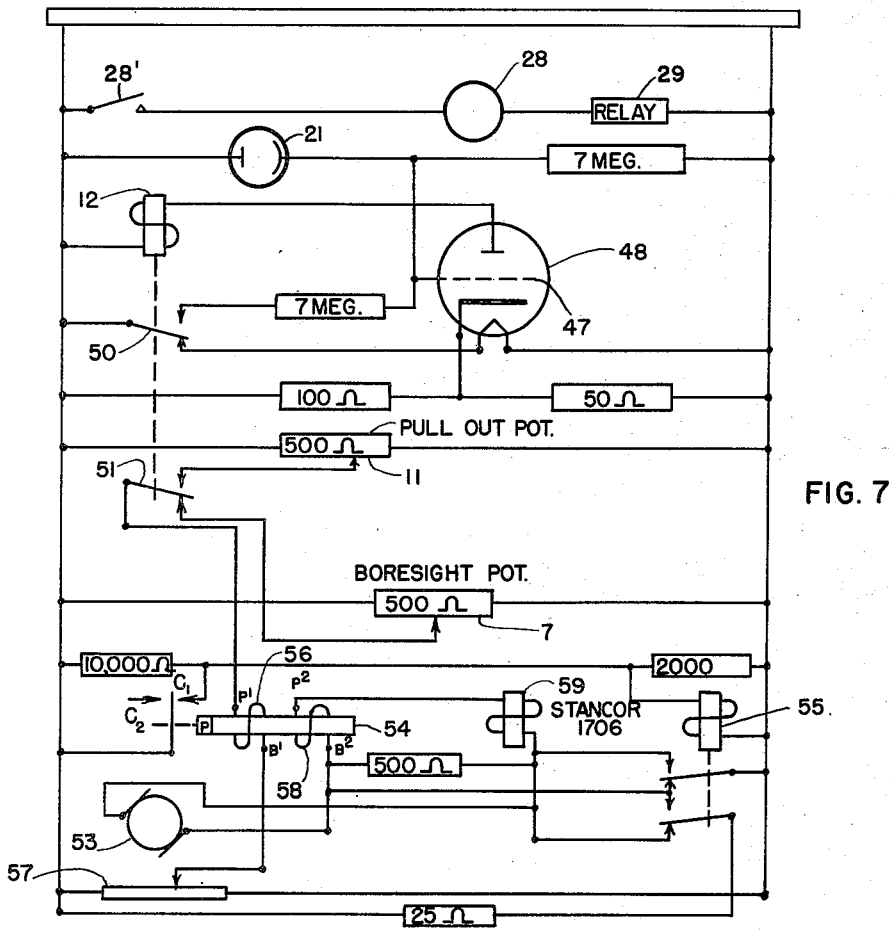
Fig. 7 is an electrical diagram.

As shown in Figs. 5 and 6 the altimeter 26 which is shown as a pressure type altimeter actuates a rock shaft 32 carrying a cam 33 which is engaged by a cam follower 33' mounted on an arm 34 on the rock shaft 35 carrying the mirror 17. The altimeter includes a base 36 rotatably mounted in the casing 30 for adjustment by a screw 37 engaging a lug 38 on the base. This adjusting screw can be actuated by a remote control unit engaging a shaft 41 connected by gears 42, 43, to the screw 37. The pilot sets the instrument according to the barometer and the altitude of his target before flight.

The design of the cam and the other connections between the altimeter and the shaft are such that the mirror will be turned through an angle proportional to the change in the logarithm of the altitude. If there is a lag in the operation of the altimeter due allowance must be made.

The connections between the rate of descent instrument and the mirror 16 are such that the mirror is turned through an angle corresponding directly to the rate of descent.

Figure 9:
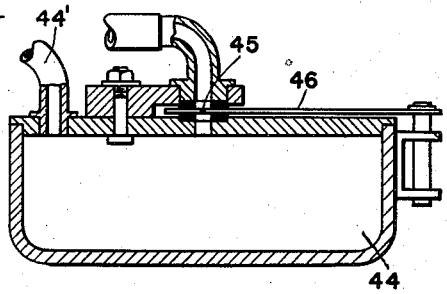
Fig. 9 is a central sectional view through the air tank of the rate of descent instrument.

If the pilot wishes to pull out less abruptly in order to subject himself to less centrifugal force, or if he wishes to pull out at a lower altitude even though he must endure the higher centrifugal force of an abrupt pull-out then it is necessary to provide an adjustment of the instrumentation whereby the pull-out will be indicated at a correspondingly higher or lower altitude. In the instrument shown, the desired end is accomplished by providing an adjustment whereby restriction in the conduit from the tank to atmosphere is made larger or smaller. By this arrangement the signal will be given sooner or later during the dive as the aperture is smaller or larger. As shown in Figs. 6 and 9, the tank 44 forming a part of the rate of descent instrument is connected by a suitable conduit 44' to the air pressure capsule, and connection with static pressure is made through another conduit which is restricted by one of the apertures 45 in the plate 46. This plate is adjustable to bring any one of the several apertures 45 of different sizes into position to determine the restriction of the conduit.

This method of providing adjustment is sufficiently accurate to accomplish the purposes intended. The resultant effect of the substitution of the apertures of different sizes may be obtained with sufficient accuracy by test or calculation and then certain of these apertures can be marked 2g, 3g, 4g, etc., to indicate the centrifugal force of the pull-out for which each is designed.

THEORY OF OPERATION

Figure 8:
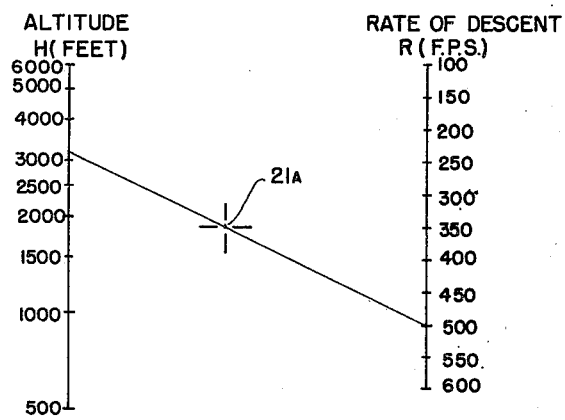
Fig. 8 is a nomograph.

The computation of the minimum safe pull-out altitude is represented in the nomograph Fig. 8 wherein the rate of descent is plotted linearly and the alttiude is plotted logarithmetically. In the creation of the nomograph the minimum safe pull-out altitudes for various rates of descent were plotted and it was found that the curve was of such character that the logarithmic scale could be used without introducing an error beyond permissible limits. A straight line drawn from a point representing the rate of descent, through the fixed point 21A, will intercept the altitude line at a point giving the minimum safe pull-out altitude for that rate of descent. The altitude so indicated includes both the anticipated loss of altitude during pull-out and an additional factor of safety. Also if during a dive a straight line is maintained between points on the rate of descent and altitude lines representing the momentary rate of descent and altitude of the aircraft such line will touch the fixed point 21a when the minimum safe pull-out altitude is reached. This nomograph is in effect reproduced in the instrumentation shown wherein the photo cell 21 corresponds to the fixed point 21a and the beam of light corresponds to the movable computing line of the nomograph.

Referring to the electrical diagram, when the photo electric cell 21 is energized by the beam of light to pass current it applies voltage to the control grid 47 of amplifier tube 48, the plate circuit of which in turn actuates relay 12. Switch 50 of the relay opens the filament heating circuit and locks the grid at positive potential. The other switch 51 of the relay shifts the remote control circuit by which the reticule is controlled from connection with the potentiometer 7 and connects it with the pull-out potentiometer 11.

The relay 12 will hold the circuits in this condition for perhaps 30 seconds while the filament of the amplifier tube 48 cools. This is sufficient for the pull-out. When the filament cools sufficiently the plate current through the relay 12 will cease and the circuit will be restored to its original condition.

The remote control circuit for controlling the reticule of the sight unit comprises the follow-up motor 53 which is controlled by Wheatstone bridge circuit including the polarized relay 54 and reversing relay 55 and one of the potentiometers 7 and 11 depending upon the position of the relay 12. The cross branch of the Wheatstone bridge circuit includes a winding 56 of the polarized relay 54 and is connected to a variable resistance 57. A second winding 58 may be described as a derivative coil or feed-back, the voltage supplied to which is proportional to the speed of the motor 53. A choke coil 59 is arranged in series with this winding to prevent too rapid reversal. The polarized relay 54 controls the reversing relay 55 to reverse the motor. This circuit is similar to that shown in application of Robert Alkan, Serial #574,144, filed January 23, 1945, which is now held abandoned.

It is an important feature of the invention in its preferred embodiments that the safe pull-out altitude computer causes the pull-out to be initiated without requiring that the pilot shall make a difficult change in the direction of his attention at a time when he is tense and intent on keeping the target centered in the sight. In the embodiment of the invention illustrated the line of sight is moved and the pilot by continuing to keep the sight on the target initiates the pull-out. This arrangement in which the pilot is caused to initiate the pull-out as distinguished from a fully automatic pull-out is shown for the purposes of illustration and not as indicating a necessary choice of method. The movement of the reticule serves two purposes—as it starts to move it causes the pilot to start the pull-out automatically by attempting to keep the sight on the target but also it moves with sufficient suddenness and far enough to more or less go out of sight and this serves as a signal to the pilot advising him that the pull-out is necessary.

The foregoing description of a particular embodiment is illustrative merely and is not intended as defining limits of the invention.

I claim:

1. In a sighting arrangement of the character described, in combination, a sight unit having a movable reticule, an electrical circuit for controlling said reticule during a dive toward a target, a second electrical circuit for controlling said reticule during pull-out from the dive, an altimeter, a rate of descent indicator, and means connected to the altimeter and rate of descent indicator to be actuated jointly thereby to shift control of the reticule from the first mentioned electrical circuit to the second electrical circuit when the altitude and rate of descent reach predetermined relative values.

2. In a sighting arrangement of the character described, in combination, a sight unit having a movable reticule, an electrical circuit for controlling said reticule during a dive toward a target, a second electrical circuit for controlling said reticule during pull-out from the dive, an altimeter, a rate of descent indicator, a series of mirrors including a rotating mirror controlled by the altimeter and a rotating mirror controlled by the rate of descent indicator, a source of light, a light sensitive cell to which light from said source is directed by said mirrors when in certain relative positions, an electrical circuit of which the cell forms a part arranged to shift control of the reticule from the first mentioned electrical circuit to the second electrical circuit.

3. In a sighting apparatus of the character described, in combination, a sight unit having a movable reticule, an electrical circuit for controlling said reticule during a dive toward a target, a second electrical circuit for controlling said reticule during pull-out from the dive, and a safe pull-out altitude computer adapted to shift control of the movable reticule from the first mentioned circuit to the second circuit comprising a light source, a photo-electric cell, a plurality of movable mirrors adapted to reflect a beam of light from the source along an optical axis to the photo-electric cell, or away from said cell, an altimeter, means controlled by the altimeter for turning one of said mirrors to move the beam of light toward said photo-electric cell as the altimeter indicates decreasing altitude, a rate of descent indicator, means controlled by the rate of descent indicator for turning one of said mirrors to move the beam of light toward the photo-electric cell as the rate of descent indicator indicates increasing rate of descent, an electrical circuit of which the photo-electric cell forms a part for shifting control of the reticule from the first mentioned circuit to the second circuit.

AMEDEE COSTA DE BEAUREGARD.

REFERENCES CITED

The following references are of record in the file of this patent:

UNITED STATES PATENTS

| Number | Name | Date |
|---|---|---|
| 2,125,225 | Gourdou | July 26, 1938 |
| 2,299,313 | Durgin | Oct. 20, 1942 |
| 2,410,058 | Frische et al. | Oct. 29, 1946 |
| 2,410,097 | Morgenthaler, et al. | Oct. 29, 1946 |
| 2,424,257 | Sherman | July 22, 1947 |
| 2,464,195 | Burley et al. | Mar. 8, 1949 |

FOREIGN PATENTS

| Number | Country | Date |
|---|---|---|
| 666,563 | Germany | Oct. 24, 1938 |